(12) United States Patent
Vladimerou

(10) Patent No.: US 12,668,150 B2
(45) Date of Patent: Jun. 30, 2026

(54) ELECTRIC VEHICLE BATTERY DISPLACEMENT STRUCTURE

(71) Applicant: Toyota Motor Engineering & Manufacturing North America, Inc., Plano, TX (US)

(72) Inventor: Vladimeros Vladimerou, Whitmore Lake, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 453 days.

(21) Appl. No.: 18/317,716

(22) Filed: May 15, 2023

(65) Prior Publication Data

US 2024/0383367 A1 Nov. 21, 2024

(51) Int. Cl.
*B60L 53/80* (2019.01)
*B60L 50/64* (2019.01)
*H01M 50/244* (2021.01)
*H01M 50/249* (2021.01)

(52) U.S. Cl.
CPC .............. *B60L 53/80* (2019.02); *B60L 50/64* (2019.02); *H01M 50/244* (2021.01); *H01M 50/249* (2021.01)

(58) Field of Classification Search
CPC ................................ B60L 53/80; B60L 50/64
See application file for complete search history.

(56) References Cited

U.S. PATENT DOCUMENTS

| | | | | |
|---|---|---|---|---|
| 3,838,745 | A | 10/1974 | Kappei | |
| 4,450,400 | A * | 5/1984 | Gwyn | B60L 53/80 414/373 |
| 5,452,983 | A * | 9/1995 | Parmley, Sr. | B60L 53/80 414/676 |
| 5,760,569 | A * | 6/1998 | Chase, Jr. | H01M 50/204 414/281 |
| 8,146,694 | B2 | 4/2012 | Hamidi | |
| 9,358,895 | B2 | 6/2016 | Avganim | |
| 9,850,114 | B2 * | 12/2017 | Gilland | B66F 9/0754 |
| 10,112,471 | B2 * | 10/2018 | Higuchi | B60L 53/80 |
| 10,562,403 | B2 * | 2/2020 | Falconer | B60L 50/64 |
| 11,904,673 | B2 * | 2/2024 | Lampsa | B60L 53/14 |
| 2005/0274556 | A1 | 12/2005 | Chaney | |

(Continued)

FOREIGN PATENT DOCUMENTS

EP 2311166 A2 4/2011

*Primary Examiner* — Brian L Swenson
(74) *Attorney, Agent, or Firm* — Jordan IP Law, LLC

(57) ABSTRACT

Apparatuses, systems, and methods relate to technology to determine a first height of first rails within a first storage compartment of a displacement structure. The technology determines that a first battery in a battery compartment of a vehicle is to be removed, where the battery compartment includes vehicle rails having a vehicle height. The technology adjusts the first height of the first rails to align the first rails with the vehicle rails by adjusting the first height to match the vehicle height so that the first rails and the vehicle rails form a first pathway. The technology guides the first battery into the first storage compartment from the battery compartment along the first pathway when the first rails are aligned with the vehicle rails.

12 Claims, 6 Drawing Sheets

(56) References Cited

U.S. PATENT DOCUMENTS

2010/0292877 A1* 11/2010 Lee .......................... B60L 50/66
                                                        180/68.5
2012/0291250 A1* 11/2012 Escande ................. B60L 53/80
                                                        29/525
2013/0104361 A1   5/2013 Corfitsen
2015/0114736 A1*  4/2015 Avganim ................ B60K 1/04
                                                        180/68.5
2019/0016231 A1   1/2019 Scaringe et al.

* cited by examiner

208

202

204

OD @ Full Stroke

Ht. @ Stroke

Stroke Lg.

Compressed Ht.

Shown Extended

Shown Compressed

206

Figure 5:
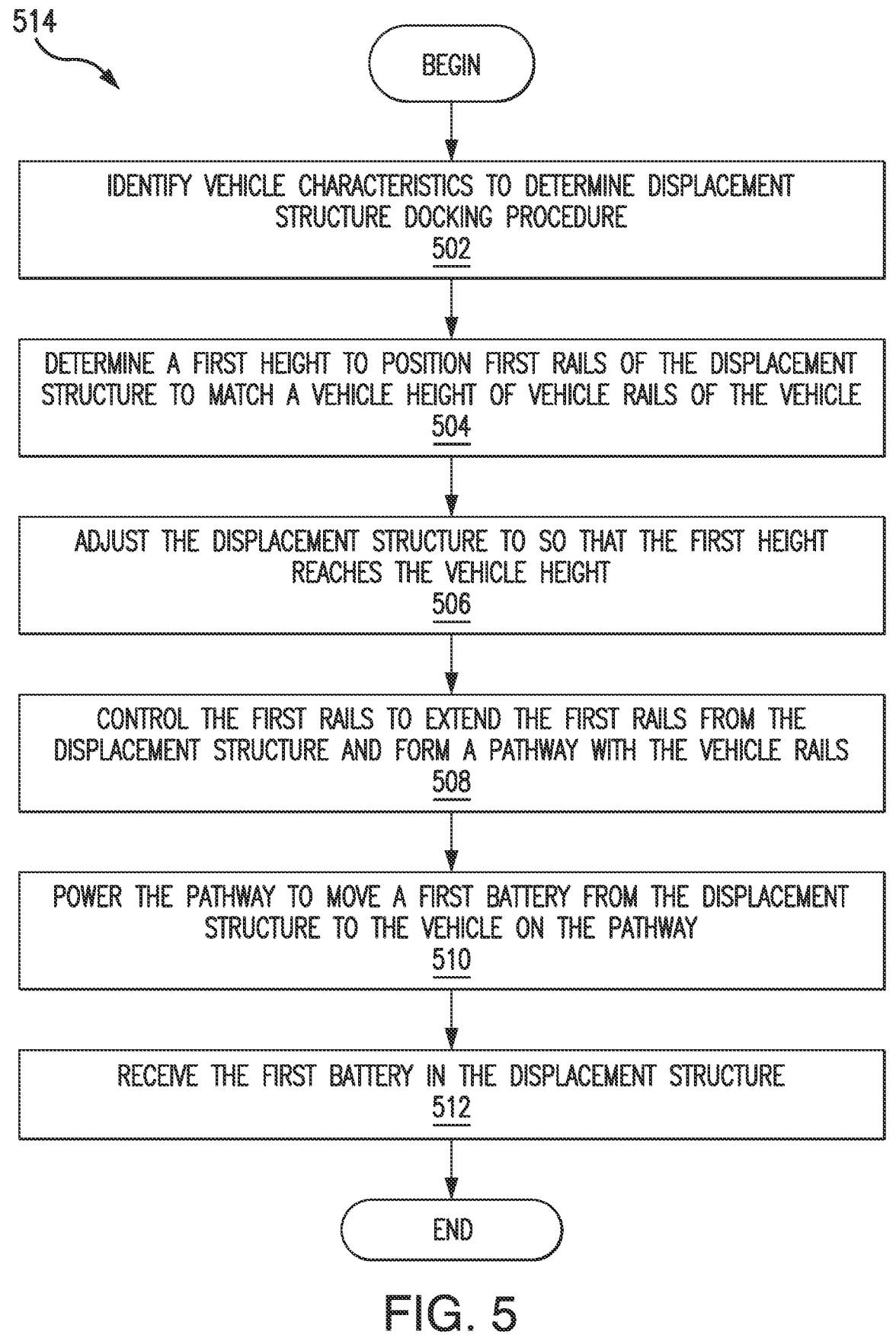

514

BEGIN

IDENTIFY VEHICLE CHARACTERISTICS TO DETERMINE DISPLACEMENT
STRUCTURE DOCKING PROCEDURE
502

DETERMINE A FIRST HEIGHT TO POSITION FIRST RAILS OF THE DISPLACEMENT
STRUCTURE TO MATCH A VEHICLE HEIGHT OF VEHICLE RAILS OF THE VEHICLE
504

ADJUST THE DISPLACEMENT STRUCTURE TO SO THAT THE FIRST HEIGHT
REACHES THE VEHICLE HEIGHT
506

CONTROL THE FIRST RAILS TO EXTEND THE FIRST RAILS FROM THE
DISPLACEMENT STRUCTURE AND FORM A PATHWAY WITH THE VEHICLE RAILS
508

POWER THE PATHWAY TO MOVE A FIRST BATTERY FROM THE DISPLACEMENT
STRUCTURE TO THE VEHICLE ON THE PATHWAY
510

RECEIVE THE FIRST BATTERY IN THE DISPLACEMENT STRUCTURE
512

END

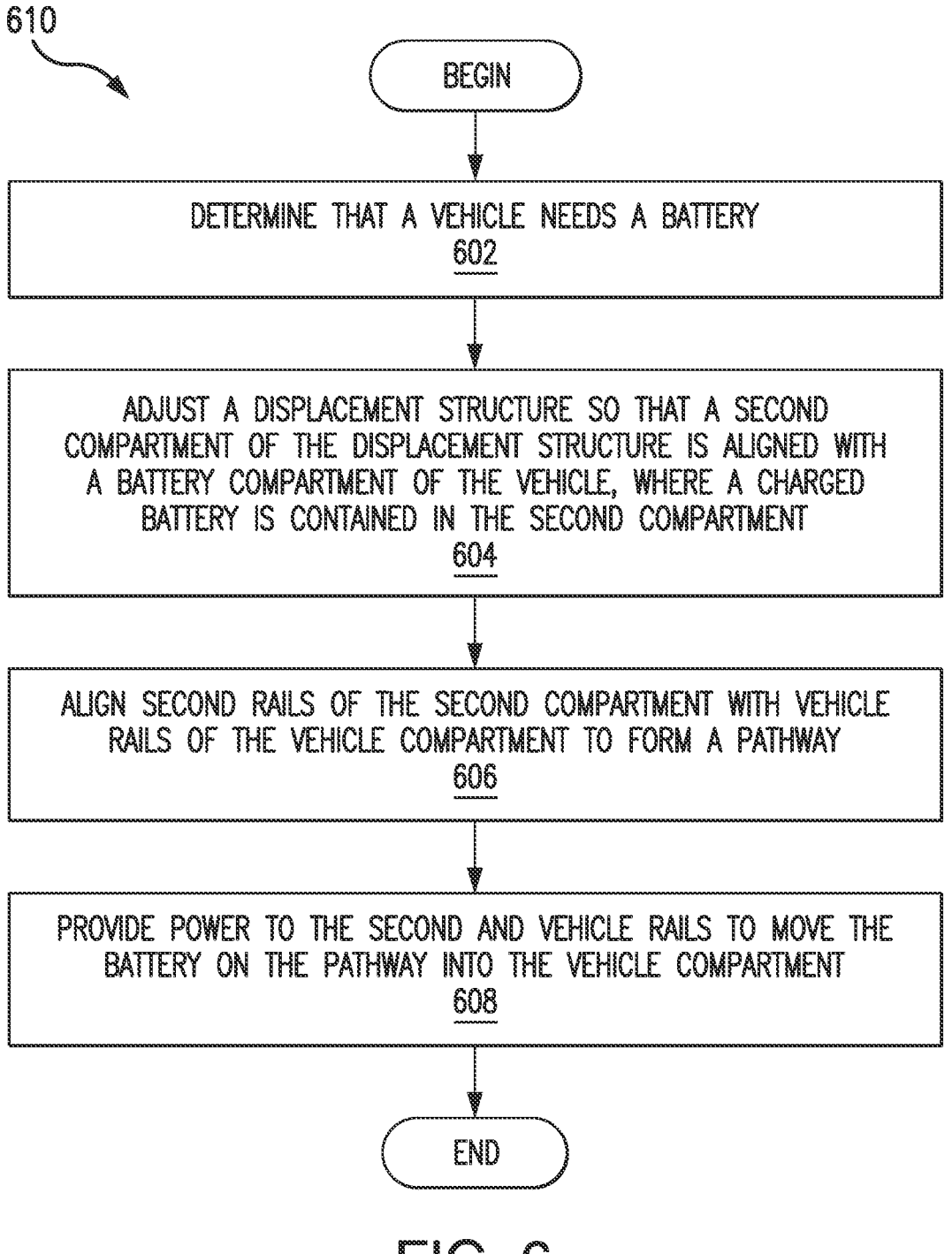

BEGIN

DETERMINE THAT A VEHICLE NEEDS A BATTERY
602

ADJUST A DISPLACEMENT STRUCTURE SO THAT A SECOND
COMPARTMENT OF THE DISPLACEMENT STRUCTURE IS ALIGNED WITH
A BATTERY COMPARTMENT OF THE VEHICLE, WHERE A CHARGED
BATTERY IS CONTAINED IN THE SECOND COMPARTMENT
604

ALIGN SECOND RAILS OF THE SECOND COMPARTMENT WITH VEHICLE
RAILS OF THE VEHICLE COMPARTMENT TO FORM A PATHWAY
606

PROVIDE POWER TO THE SECOND AND VEHICLE RAILS TO MOVE THE
BATTERY ON THE PATHWAY INTO THE VEHICLE COMPARTMENT
608

END

FIG. 6

ELECTRIC VEHICLE BATTERY DISPLACEMENT STRUCTURE

TECHNICAL FIELD

Embodiments generally relate to a displacement structure that is height adjustable to swap a first battery in a battery compartment of a vehicle with a second battery stored on the displacement structure.

BACKGROUND

An electric vehicle (EV) includes an EV battery. The EV battery stores electrical energy to power a motor of the EV. The EV battery is rechargeable and includes high energy density cells to store a large amount of energy in a relatively small space. The size and capacity of an EV battery vary depending on the EV design and intended use.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a displacement structure. The displacement structure includes a first storage compartment. The displacement structure also includes a height adjustment mechanism that adjusts a height of the displacement structure. The displacement structure also includes first rails disposed within the first storage compartment and that align with vehicle rails disposed within a battery compartment of a vehicle when the height adjustment mechanism adjusts a first height of the first rails to match a vehicle height of the vehicle rails so that the first rails and the vehicle rails form a first pathway, where a first battery is disposed on the vehicle rails in the battery compartment and is able to be guided into the first storage compartment from the battery compartment along the first pathway when the first rails are aligned with the vehicle rails. Other examples of this aspect include corresponding computer systems, apparatus, and computer programs recorded on one or more computer storage devices, each configured to perform the actions of the methods.

One general aspect includes a battery exchange system that includes a first battery disposed on vehicle rails positioned within a battery compartment of a vehicle. The battery exchange system also includes a displacement structure may include a first storage compartment, a height adjustment mechanism that adjusts a height of the displacement structure, and first rails disposed within the first storage compartment and that align with the vehicle rails when the height adjustment mechanism adjusts a first height of the first rails to match a vehicle height of the vehicle rails so that the first rails and the vehicle rails form a first pathway, where the first battery is able to be guided into the first storage compartment from the battery compartment along the first pathway when the first rails are aligned with the vehicle rails. Other examples of this aspect include corresponding computer systems, apparatus, and computer programs recorded on one or more computer storage devices, each configured to perform the actions of the methods.

One general aspect includes a method. The method includes determining a first height of first rails within a first storage compartment of a displacement structure. The method also includes determining that a first battery in a battery compartment of a vehicle is to be removed, where the battery compartment includes vehicle rails having a vehicle height. The method also includes adjusting the first height of the first rails to align the first rails with the vehicle rails by adjusting the first height to match the vehicle height so that the first rails and the vehicle rails form a first pathway. The method also includes guiding the first battery into the first storage compartment from the battery compartment along the first pathway when the first rails are aligned with the vehicle rails. Other examples of this aspect include corresponding computer systems, apparatus, and computer programs recorded on one or more computer storage devices, each configured to perform the actions of the methods.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart of a method of loading a battery into a displacement structure according to an embodiment;

FIG. 6 is a flowchart of a method of inserting a battery into a vehicle from a displacement structure according to an embodiment.

DETAILED DESCRIPTION

EV batteries may have a considerable weight (e.g., 1,000 pounds or more). To service EV vehicles, EV batteries may be removed to analyze, recharge and/or maintain the EV batteries. The EV batteries may be strenuous and difficult to remove from the EV due to the considerable weight of the EV. Further, once removed, the EV battery may be difficult to transport. Examples herein provide a system that eases the removal and transportation process of an EV battery.

Figure 1:
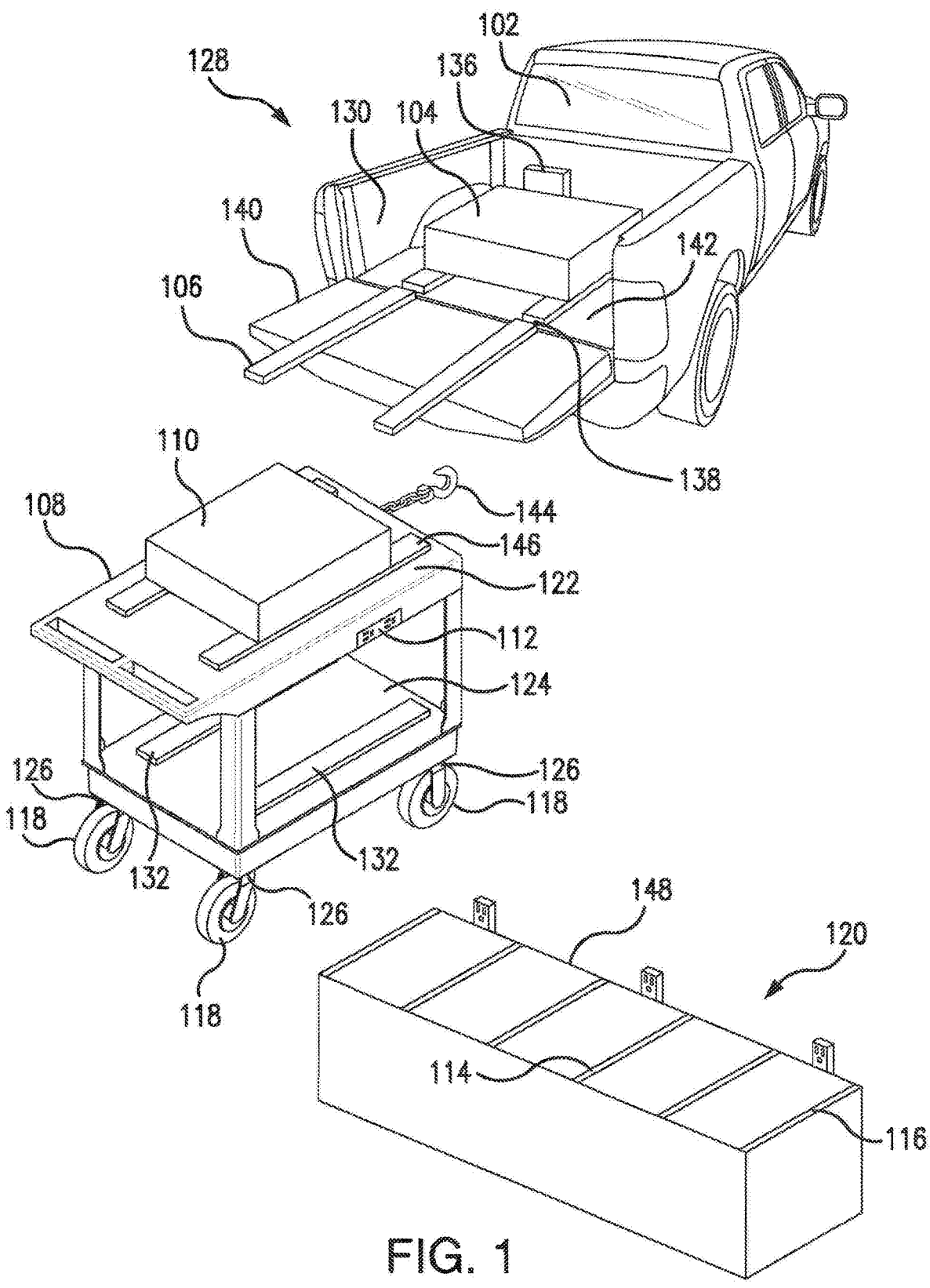
FIG. 1 illustrates a diagram of a battery exchange process in accordance with an example.

Turning to FIG. 1, a battery exchange process 128 is illustrated. The battery exchange process 128 includes a vehicle 102 (e.g., an EV). The vehicle 102 includes a first battery 104 that has a low charge (e.g., a low power and/or has a charge underneath a certain threshold of power). Rather than charging the first battery 104 in the vehicle 102, the first battery 104 may be swapped with a second battery 110 that is charged (e.g., fully charged). That is, the second battery 110 has a greater charge than the first battery 104 and may provide sufficient power to the vehicle 102 to execute functions of the vehicle 102. Doing so may be less time consuming than charging the first battery 104 in the vehicle 102 and then operating the vehicle 102 based on power from the first battery 104.

A displacement structure 108 (e.g., a gurney, a mobile charging bench, cart, etc.) may facilitate the swapping of the first battery 104 and the second battery 110. The displacement structure 108 may be powered (e.g., fully automated) in some examples, manually maneuvered, or operated with a mixture of automated and manual operations. The displacement structure 108 may be height adjustable to elevate a first storage compartment 124 to move the first battery 104 into the first storage compartment 124, and then adjust the height of the displacement structure 108 to move the second battery 110 onto a second storage compartment 122 of the vehicle 102. Doing so cases the removal and transportation process of the first battery 104 (e.g., an EV battery) and the transportation and insertion of the second battery 110 into the vehicle 102.

In this example, the displacement structure 108 includes wheels 118 to move the displacement structure 108. The wheels 118 may be powered in some examples to move the displacement structure 108 with minimal or no power from a user. For example, the wheels 118 may be driven by a motor or engine that receives electrical energy from the first battery 104 to provide motion to the displacement structure 108. The displacement structure 108 may be powered through a battery, such as the first battery 104 and/or the second battery 110, to power various systems of the displacement structure 108.

The displacement structure 108 includes the first storage compartment 124. The first storage compartment 124 may be sized to contain the first battery 104 when the first battery 104 is removed from the vehicle 102. First rails 132 are disposed and formed to receive corresponding structures of the EV batteries, such as the first battery 104. For example, the first battery 104 may include wheels that allow the first battery 104 to roll on rails, such as first rails 132. As illustrated, the first storage compartment 124 may initially be positioned at a different height than the first battery 104.

The vehicle 102 includes a battery compartment 130 that houses and stores the first battery 104. In some examples, the battery compartment 130 may be fully enclosed when the vehicle 102 is operated (e.g., actuated and moved under the control of an operator) and opened when the first battery 104 is swapped for the second battery 110. The battery compartment 130 includes vehicle rails 106. The wheels of the first battery 104 are further configured and formed to slide along the vehicle rails 106, as well as the first rails 132. A vehicle height of the battery compartment 130 and/or the vehicle rails 106 of the vehicle 102 is different from a first height of the first rails 132 and/or the first storage compartment 124.

The displacement structure 108 include a height adjustment mechanism 126 to adjust the first height of the first rails 132 to be equal to the vehicle height so that the first battery 104 is slidable into the first storage compartment 124. For example, the height adjustment mechanism 126 may lift the first storage compartment 124 so that the first rails 132 and the vehicle rails 106 are even and/or level with each other. In such examples, the first height is the height of first rails 132. When the first rails 132 and the vehicle rails 106 are even and/or level with each other, the first rails 132 and the vehicle rails 106 may form a first pathway. The first battery 104 may then be rolled along the first pathway to remove the first battery 104 from the vehicle 102.

The vehicle 102 includes a battery connector 136 that may be located at one end of the vehicle rails 106. The battery connector 136 may couple with a battery, such as the first battery 104, to supply power to the vehicle 102. The other end of the vehicle rails 106 may connect with the first rails 132 when the first rails 132 are positioned at the vehicle height by the height adjustment mechanism 126.

The vehicle rails 106 and/or the first rails 132 may be electrically powered to slide the first battery 104 along the vehicle rails 106 and/or the first rails 132. For example, the vehicle rails 106 and/or the first rails 132 may be powered using the power of the first battery 104 and/or the second battery 110. To remove the first battery 104 from the vehicle 102, the first rails 132 may be controlled (e.g., automatically and/or manually) to slide the first battery 104 onto the first storage compartment 124. Thus, the first rails 132 may be power-aligned with the vehicle rails 106 to directly slide the first battery 104 onto the displacement structure 108, and in particular into the first storage compartment 124. For example, the first rails 132 may be electrically powered to extend from the first storage compartment 124 to and/or into the battery compartment 130 and couple with the vehicle rails 106.

Thus, the first rails 132 are disposed within the first storage compartment 124 and align with vehicle rails 106 disposed within the battery compartment 130 of the vehicle 102 when the height adjustment mechanism 126 adjusts the first height of the first rails 132 to match the vehicle height of the vehicle rails 106 so that the first rails 132 and the vehicle rails 106 form a first pathway. The first battery 104 is disposed on the vehicle rails 106 in the battery compartment 130 and is able to be guided into the first storage compartment 124 from the battery compartment 130 along the first pathway, that comprises the first rails 132 and the vehicle rails 106, when the first rails 132 are aligned with the vehicle rails 106.

When a user wants to remove the first battery 104 from the vehicle 102, the user deploys the displacement structure 108. In some examples, the displacement structure 108 may be fully automated and is guided to the vehicle 102 via sensors (e.g., proximity sensors, global positioning satellite sensors, imaging sensors, infrared sensors, etc.). In some examples, the vehicle 102 may include a transmitter that transmits a location of the vehicle 102 and the vehicle height of the vehicle rails 106. The displacement structure 108 may navigate to the vehicle 102 and adjust a height of the displacement structure 108 based on the transmitted location and the transmitted vehicle height. In some examples, the displacement structure 108 may automatically identify the vehicle rails 106 based on images from imaging sensors of the displacement structure 108. In some examples, the vehicle 102 may include corresponding structures and/or identifying details (e.g., a barcode that encodes the vehicle height information) to guide the displacement structure 108 to the vehicle height.

In some examples, the user may control the displacement structure 108. For example, where the vehicle rails 106 are at a greater height than the displacement structure 108, the user may interact with a lever, user interface, etc. of the displacement structure 108 to raise the first rails 132 and first battery 104 to the vehicle height that allows the vehicle rails 106 and/or the first rails 132 to slide the first battery 104 onto the displacement structure 108.

In some examples, the displacement structure 108 also includes anchors 144 to fasten the displacement structure 108 to the vehicle 102. When removing the EV battery from the vehicle using the displacement structure 108, the displacement structure 108 may anchor onto a portion of the vehicle 102 (e.g., bumper, rear wall, etc.) for leverage with the anchors 144. The anchor 144 to the vehicle may include magnets, mounting brackets, or any other anchoring device that may temporarily fasten to the vehicle 102.

As noted above, the first battery 104 may include wheels. The wheels are rollable along the first rails 132 and the vehicle rails 106, where the wheels are displaced from each other along a longitudinal direction of the first battery 104. Doing so allows the first battery 104 to move over discontinuities in the first pathway comprising the first rails 132 and the vehicle rails 106. That is, discontinuities may exist along the first pathway formed by the first rails 132 and the vehicle rails 106. For example, a first part of the vehicle rails 106 may be separated from a second part of the vehicle rails 106 at a space 138 between a tailgate 140 of the vehicle 102 and a truck bed 142 of the vehicle 102. The space 138 permits the tailgate 140 to be closed (rotated upward). If the vehicle rails 106 extended into the space 138, the vehicle rails 106 may be unable to be bent as the tailgate 140 is rotated, preventing the tailgate 140 from closing, or alternatively damaging the vehicle rails 106. Thus, to permit the tailgate 140 to be closed, the vehicle rails 106 do not extend into the space 138 between the tailgate 140 and the truck bed 142. Thus, to avoid having the wheels (e.g., both rear wheel or both forward wheels) of the first battery 104 from falling into the space 138, examples longitudinally disperse the wheels along a longitudinal direction of the first battery 104 so that so that the wheels are not aligned with each other along a transverse direction of the first battery 104. For example, the rotational axes of the wheels are distinct from each other and are not colinear.

The first rails 132 may be electrically powered to extend from the displacement structure 108 into the vehicle 102 and align with the vehicle rails 106. The anchors 144 may be anchored to the vehicle 102 as the first rails 132 are electrically powered to extend into the vehicle 102. In some examples the first portion of the vehicle rails 106 on the tailgate 140 may be omitted so that no part of the vehicle rails 106 are on the tailgate 140, and the first rails 132 may extend into the vehicle 102 onto the tailgate 140. The space 138 may remain between the second portion of the first rails 132, which is on the truck bed 142, and the first rails 132.

Once the first battery 104 is disconnected from the vehicle 102 and loaded onto the displacement structure 108, the displacement structure 108 may move the first battery 104 away from the vehicle 102. For example, the first and/or second battery 104, 110 may power the displacement structure 108 to move the first battery 104 along the first pathway and/or move the displacement structure 108. The first and/or second battery 104, 110 may include a system for monitoring the state of charge (SOC) of the first and/or second battery 104, 110. If the SOC of the first and/or second battery 104, 110 is below a predefined threshold, for example because the first and/or second battery 104, 110 is being used to power other vehicle systems of the vehicle 102, the system may send a notification to the user warning the user of the SOC (e.g., battery level) being too low to power the displacement structure 108 and bypass charging the displacement structure 108 from the first and/or second battery 104, 110.

In some examples, the displacement structure 108 includes a second storage compartment 122 disposed at a second height different from the first height. Second rails 146 are disposed in the second storage compartment 122. A second battery 110 is stored in the second storage compartment 122 and on the second rails 146. The second battery 110 includes wheels, similar to the first battery 104, that are adapted to roll along the second rails 146. The second battery 110 has a greater charge level than a charge level of the first battery 104. The height adjustment mechanism 126 adjusts the second height to align the second rails 146 with the vehicle rails 106 so that the vehicle rails 106 and the second rails 146 form a second pathway to move the second battery 110 into the battery compartment 130. The second battery 110 may then be coupled with battery connector 136 and may power the vehicle 102. The second battery 110 may be moved onto the vehicle 102 similarly to how the first battery 104 is removed. For example, the second rails 146 and the vehicle rails 106 may be powered to move the second battery 110 onto the vehicle 102. The second battery 110 may be connected to the battery connector 136.

Once the second battery 110 is loaded onto the vehicle 102 and the first battery 104 is loaded onto the displacement structure 108, the displacement structure 108 may be moved away from the vehicle 102. For example, the anchors 144 may be detached from the displacement structure 108. The displacement structure 108 may then power the first battery 104. For example, the first battery 104 may be moved and/or connected with a battery charging counter 120 to receive charge from the battery charging counter 120. In some examples, the displacement structure 108 may include a power connector 112 that is electrically connected to one charging station of the charging stations 148, 114, 116 of the battery charging counter 120. In such a case the first battery 104 may be stored on the displacement structure 108 and charged by the displacement structure 108 based on power received from the one charging station until the first battery 104 has a charge above a threshold. When the charge is above the threshold, the displacement structure 108 may be similarly controlled and powered to insert the first battery 104 into a different vehicle.

In some examples, the displacement structure 108 is a gurney-like structure. Vehicle 102 is illustrated as a pickup truck in this example, but any type of EV may be substituted for the pickup truck.

Thus, some examples include a structure designed to facilitate displacement (e.g., installation, removal, and transport, etc.) of a high-voltage (HV) EV battery such as the first battery 104 and/or second battery 110. The EV battery may be located in any cargo compartment or housing of the vehicle 102 (e.g., the truck bed, frunk, trunk, spare tire area, etc.). When the first battery 104 and/or second battery 110 is in the EV, the first battery 104 and/or second battery 110 battery can be connected to the vehicle 102 to provide power to the vehicle 102. The displacement structure 108 may anchor to the vehicle 102 during loading and unloading of the first battery 104 and/or second battery 110.

In some examples, the vehicle rails 106, first rails 132 and/or second rails 146 may be detachable parts of the displacement structure 108 and separate from the vehicle 102. The displacement structure 108 may include a battery transport platform, that includes the first and second storage compartments 124, 122, that is height adjustable to conform to a height of a surface of the vehicle 102, such as the tailgate 140 and truck bed 142, along which the first battery 104 and/or second battery 110 rolls into and/or out of the vehicle 102. The displacement structure 108 may be anchored in position with respect to the vehicle 102. The height of the platform, such as the platform supporting the first battery 104 and/or second battery 110, may be adjusted to the height of the surface, and the vehicle rails 106, first rails 132 and/or second rails 146 may be attached to the tailgate 140, truck bed 142 and displacement structure 108 so as to extend into the vehicle 102 and along the surface. The first battery 104 may then be disconnected from the vehicle 102 to roll along the vehicle rails 106 and first rails 132 onto the displacement structure 108.

Figure 2:
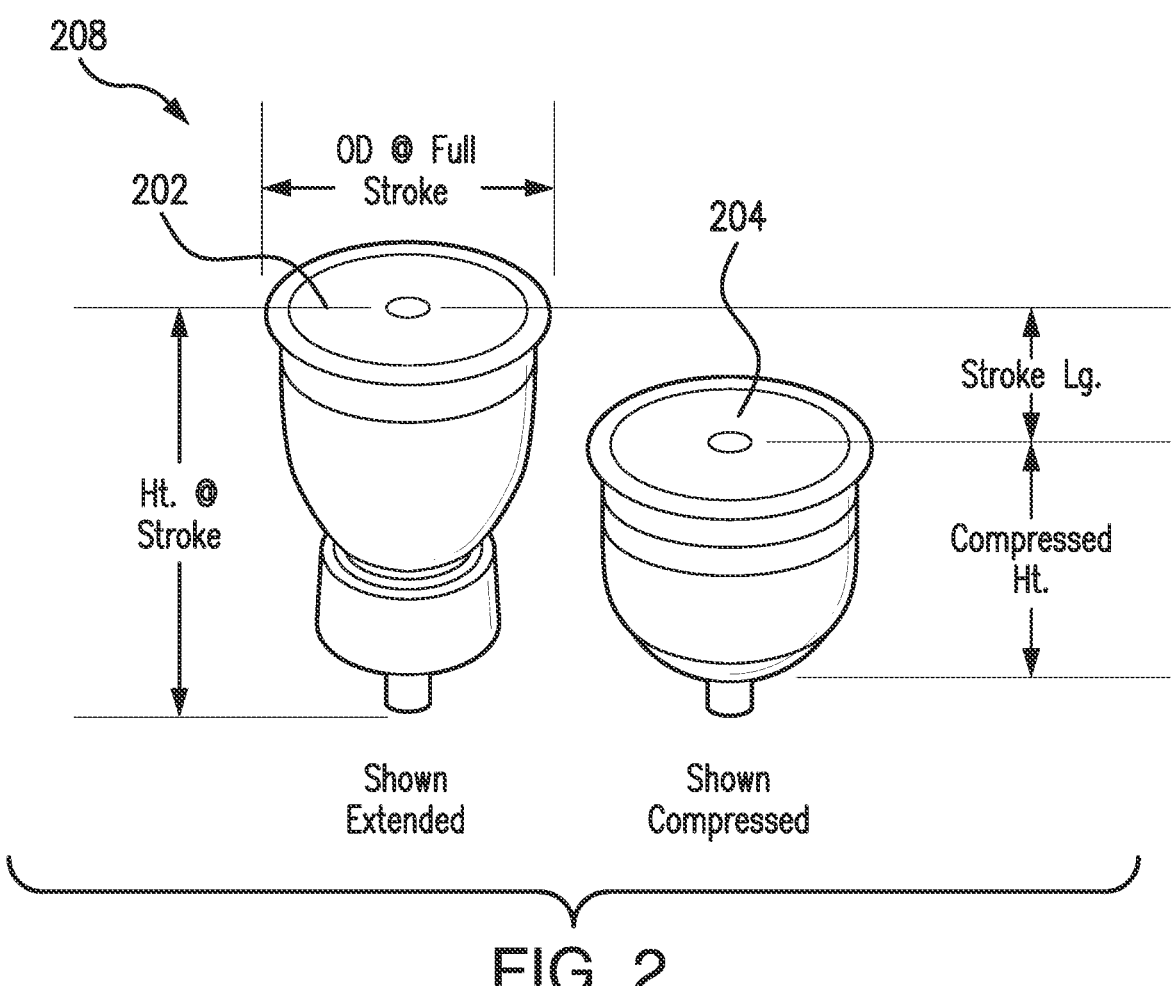
FIG. 2 illustrates an air spring in a compressed state and a decompressed state in accordance with an example.

FIG. 2 illustrates an air spring 208. The air spring 208 may serve as a height adjustment mechanism, such as height adjustment mechanism 126 (FIG. 1), to raise and/or lower a displacement structure. The air spring 208 may also isolate vibration and absorb shock from moving equipment, even with changing loads. The air spring 208 uses compressed air to adjust the air spring 208 to so that a first storage compartment and/or second storage compartment of the displacement structure matches a vehicle height of battery compartment of a vehicle. The air spring 208 is shown in a full stroke state 202, and is further shown in a compressed state 204. The air spring 208 may be adjusted to different strokes between the full stroke state 202 and compressed state 204. The air spring 208 may be readily substituted with hydraulics that may adjust the height of the battery. In some examples, the air spring 208 may operate in conjunction with hydraulics.

Figure 3:
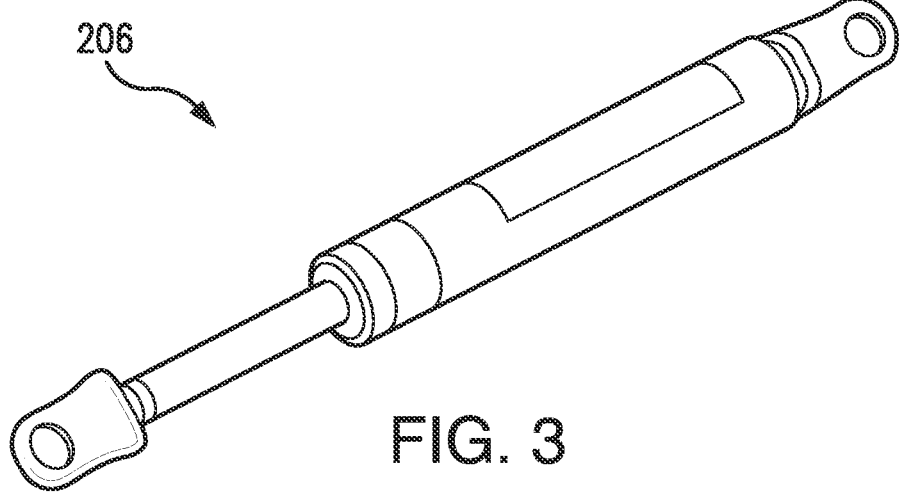
FIG. 3 illustrates a gas spring in accordance with an example.

FIG. 3 illustrates a gas spring 206. The gas spring 206 may be extended based on compressed gas contained within an enclosed cylinder sealed by a sliding piston to pneumatically store potential energy and withstand external force applied parallel to the direction of the piston shaft. The gas spring 206 may serve as a height adjustment mechanism, such as height adjustment mechanism 126 (FIG. 1), to raise and/or lower a displacement structure.

Figure 4:
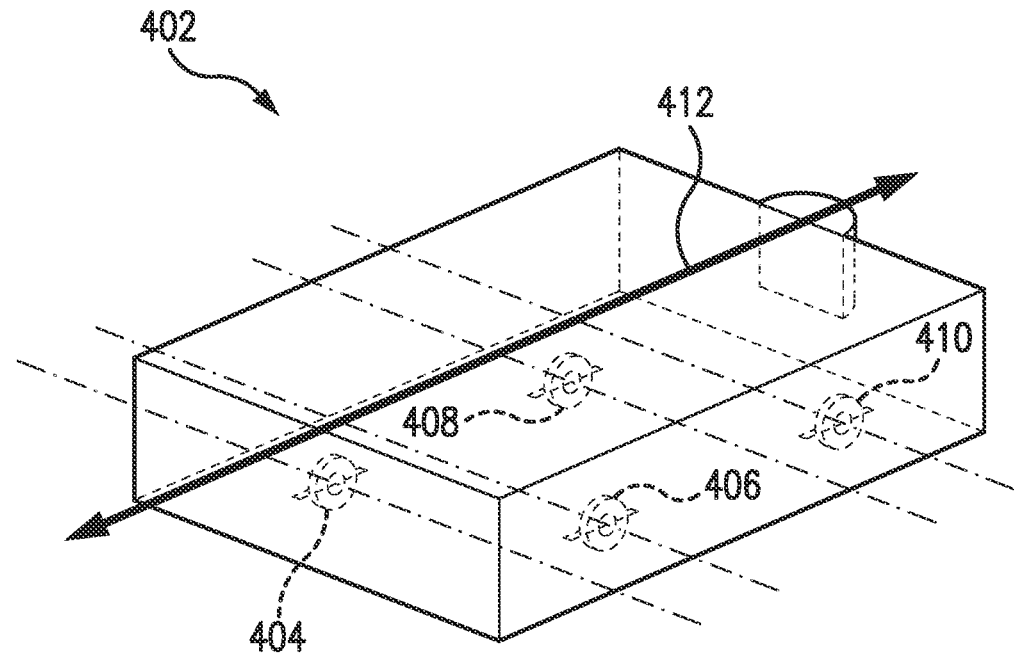
FIG. 4 illustrates a battery in accordance with an example.

While an air spring and 208 (FIG. 2) and gas spring 206 (FIG. 3) have been described, it will be understood that a hydraulic lift may readily serve as a height adjustment mechanism, such as height adjustment mechanism 126 (FIG. 1). It will be understood that various other heigh adjustment mechanisms may serve as a height adjustment mechanism, such as height adjustment mechanism 126 (FIG. 1), FIG. 4 illustrates a battery 402 that be readily substituted for the first battery 104 and/or second battery 110. First, second, third and fourth wheels 404, 406, 408, 410 may be positionally shifted relative to each other along a longitudinal direction 412 of the battery 402. Doing so results in each of the first, second, third and fourth wheels 404, 406, 408, 410 being unaligned so that the first, second, third and fourth wheels 404, 406, 408, 410 do not have co-linear rotations of axes. Doing so ensures that at least three of the first, second, third and fourth wheels 404, 406, 408, 410 make contact with a pathway (e.g., vehicle rails, first rails and/or second rails) even if gaps and/or discontinuities exist in the pathway. In some examples, a straight line that is colinear with an axis of rotation of one of the first, second, third and fourth wheels 404, 406, 408, 410 does not intersect any of the other first, second, third and fourth wheels 404, 406, 408, 410.

FIG. 5 shows a method 514 of loading a battery into a displacement structure. The method 514 may generally be implemented in the battery exchange process 128 (FIG. 1). In an embodiment, the method 514 is implemented in logic instructions (e.g., software), a non-transitory computer readable storage medium, circuitry, configurable logic, fixed-functionality hardware logic, etc., or any combination thereof.

Illustrated processing block 502 identifies vehicle characteristics to determine a displacement structure docking procedure. For example, the vehicle characteristics may include a vehicle height of a battery compartment of the vehicle, where the battery compartment is located, how to access the battery compartment, etc. Illustrated processing block 504 determines a first height to position first rails of the displacement structure to match a vehicle height of vehicle rails of the vehicle. Illustrated processing block 506 adjusts the displacement structure so that the first height reaches the vehicle height. Illustrated processing block 508 controls the first rails to extend the first rails from the displacement structure and form a pathway with the vehicle rails. Illustrated processing block 510 powers the pathway to move a first battery from the vehicle to the displacement structure on the pathway. Illustrated processing block 512 receives the first battery in the displacement structure.

FIG. 6 shows a method 610 of inserting a battery into a vehicle from a displacement structure. The method 610 may generally be implemented in the battery exchange process 128 (FIG. 1) and/or method 514 (FIG. 5). In an embodiment, the method 610 is implemented in logic instructions (e.g., software), a non-transitory computer readable storage medium, circuitry, configurable logic, fixed-functionality hardware logic, etc., or any combination thereof.

Illustrated processing block 602 determines that a vehicle needs a battery. Illustrated processing block 604 adjusts a displacement structure so that a second compartment of the displacement structure is aligned with a battery compartment of the vehicle, where a charged battery is contained in the second compartment. Illustrated processing block 606 aligns second rails of the second compartment with vehicle rails of the vehicle compartment to form a pathway. Illustrated processing block 608 provides power to the second and vehicle rails to move the battery on the pathway into the vehicle compartment.

Figure 7:
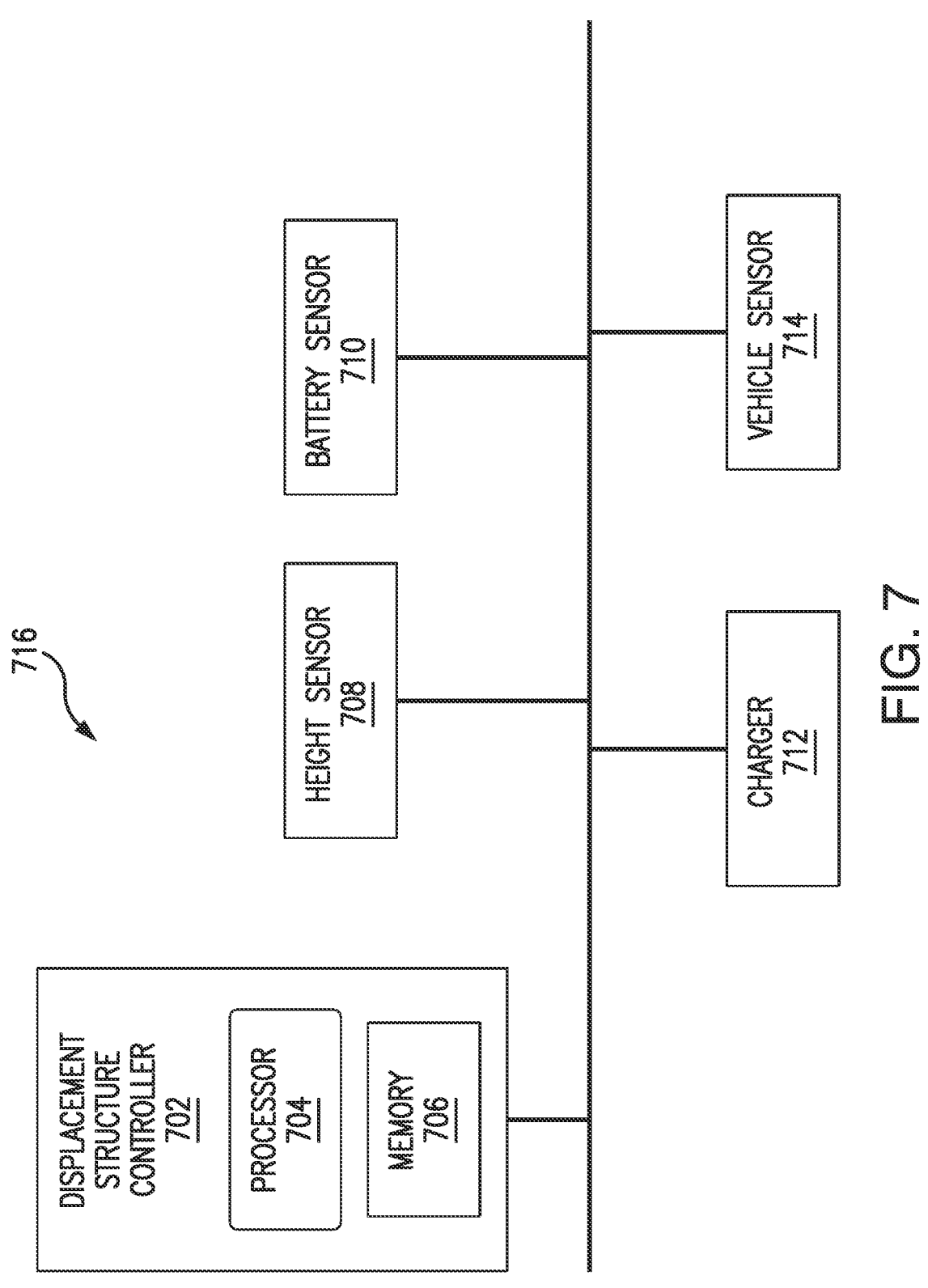
FIG. 7 is a block diagram of an example of a displacement structure system according to an embodiment.

FIG. 7 shows a more detailed example of a displacement structure control system 716. The displacement structure control system 716 may control a displacement structure and be readily substituted for be implemented in conjunction with the implemented in the battery exchange process 128 (FIG. 1), method 514 (FIG. 5) and/or method 610 (FIG. 6).

In the illustrated example, the displacement structure control system 716 may include a height sensor 708. The height sensor 708 may detect a height of the displacement structure and/or specific portions (e.g., first storage compartment and/or second storage compartment) and include a plurality of sensors. A battery sensor 710 may detect a charge of a battery. A charger 712 may charge the battery when the detected charge is below a threshold. Vehicle sensor 714 may detect a vehicle. The vehicle sensor 714 may include for example a global positioning system sensor, proximity sensor, etc.

A displacement structure controller 702 may include a processor 704 (e.g., embedded controller, central processing unit/CPU) and a memory 706 (e.g., non-volatile memory/NVM and/or volatile memory). The memory 706 contains a set of instructions, which when executed by the processor 704, cause the displacement structure controller 702 to control a displacement structure described herein based on data from the height sensor 708, battery sensor 710 and vehicle sensor 714 to swap a charged battery contained in the displacement structure with a discharged battery in the vehicle. In some examples, to do so, the displacement structure controller 702 may control the displacement structure to position the displacement structure proximate to the vehicle, anchor the displacement structure to the vehicle, adjust a height of the displacement structure (e.g., to match a height of a first storage compartment and/or second storage compartment of the displacement structure with a vehicle height of battery compartment of the vehicle).

The above described methods and systems may be readily combined together if desired. The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

What is claimed is:

1. A displacement structure comprising:

a first storage compartment;

a height adjustment mechanism that adjusts a height of the displacement structure; and first rails disposed within the first storage compartment and that align with vehicle rails disposed within a battery compartment of a vehicle when the height adjustment mechanism adjusts a first height of the first rails to match a vehicle height of the vehicle rails so that the first rails and the vehicle rails form a first pathway, wherein a first battery is disposed on the vehicle rails in the battery compartment and is able to be guided into the first storage compartment from the battery compartment along the first pathway when the first rails are aligned with the vehicle rails, wherein the first battery includes wheels that are rollable along the first rails and the vehicle rails, wherein the wheels are positionally shifted from each other along a longitudinal direction of the first battery.

2. The displacement structure of claim 1, further comprising:

anchors to fasten the displacement structure to the vehicle.

3. The displacement structure of claim 1, wherein the first rails are electrically powered to slide the first battery along the first rails and the vehicle rails, wherein the first rails are powered with power from the first battery.

4. The displacement structure of claim 1, further comprising:

a charger to charge the first battery when the first battery is in the first storage compartment.

5. A displacement structure comprising:

a first storage compartment;

a height adjustment mechanism that adjusts a height of the displacement structure;

first rails disposed within the first storage compartment and that align with vehicle rails disposed within a battery compartment of a vehicle when the height adjustment mechanism adjusts a first height of the first rails to match a vehicle height of the vehicle rails so that the first rails and the vehicle rails form a first pathway, wherein a first battery is disposed on the vehicle rails in the battery compartment and is able to be guided into the first storage compartment from the battery compartment along the first pathway when the first rails are aligned with the vehicle rails;

a second storage compartment, wherein a second battery is stored in the second storage compartment; and second rails disposed in the second storage compartment and positioned at a second height different from the first height, wherein the second battery is on the second rails, wherein the second battery includes wheels that are adapted to roll along the second rails, wherein the second battery has a greater charge level than a charge level of the first battery;

wherein the height adjustment mechanism adjusts the second height to align the second rails with the vehicle rails so that the vehicle rails and the second rails form a second pathway to move the second battery into the battery compartment from the second storage compartment.

6. A displacement structure comprising:

a first storage compartment;

a height adjustment mechanism that adjusts a height of the displacement structure;

first rails disposed within the first storage compartment and that align with vehicle rails disposed within a battery compartment of a vehicle when the height adjustment mechanism adjusts a first height of the first rails to match a vehicle height of the vehicle rails so that the first rails and the vehicle rails form a first pathway, wherein a first battery is disposed on the vehicle rails in the battery compartment and is able to be guided into the first storage compartment from the battery compartment along the first pathway when the first rails are aligned with the vehicle rails, wherein the first rails are electrically powered to extend from the displacement structure and align with the vehicle rails.

7. A battery exchange system comprising:

a first battery disposed on vehicle rails positioned within a battery compartment of a vehicle; and a displacement structure comprising:

a first storage compartment, a height adjustment mechanism that adjusts a height of the displacement structure; and first rails disposed within the first storage compartment and that align with the vehicle rails when the height adjustment mechanism adjusts a first height of the first rails to match a vehicle height of the vehicle rails so that the first rails and the vehicle rails form a first pathway, wherein the first battery is able to be guided into the first storage compartment from the battery compartment along the first pathway when the first rails are aligned with the vehicle rails, wherein the first battery includes wheels that are rollable along the first rails and the vehicle rails, wherein the wheels are positionally shifted from each other along a longitudinal direction of the first battery.

8. The battery exchange system of claim 7, wherein the displacement structure further includes:

anchors to fasten the displacement structure to the vehicle.

9. The battery exchange system of claim 7, wherein the first rails are electrically powered to extend from the displacement structure and align with the vehicle rails.

10. The battery exchange system of claim 7, wherein the first rails are electrically powered to slide the first battery along the first rails and the vehicle rails, wherein the first rails are powered with power from the first battery.

11. The battery exchange system of claim 7, wherein the displacement structure further includes:

a charger to charge the first battery when the first battery is in the first storage compartment.

12. A battery exchange system comprising:

a first battery disposed on vehicle rails positioned within a battery compartment of a vehicle;

a displacement structure comprising:

a first storage compartment, a height adjustment mechanism that adjusts a height of the displacement structure; and first rails disposed within the first storage compartment and that align with the vehicle rails when the height adjustment mechanism adjusts a first height of the first rails to match a vehicle height of the vehicle rails so that the first rails and the vehicle rails form a first pathway, wherein the first battery is able to be guided into the first storage compartment from the battery compartment along the first pathway when the first rails are aligned with the vehicle rails; and a second battery, wherein the displacement structure further includes:

a second storage compartment that stores the second battery; and second rails disposed in the second storage compartment and positioned at a second height different from the first height, wherein the second battery is on the second rails, wherein the second battery includes wheels that are adapted to roll along the second rails, wherein the second battery has a greater charge level than a charge level of the first battery, wherein the height adjustment mechanism adjusts the second height to align the second rails with the vehicle rails so that the vehicle rails and the second rails form a second pathway to move the second battery into the battery compartment from the second storage compartment.

\* \* \* \* \*